United States Patent
Benmohamed et al.

(10) Patent No.: US 7,542,416 B2
(45) Date of Patent: Jun. 2, 2009

(54) CONNECTION ADMISSION CONTROL FOR BURSTY REAL-TIME TRAFFIC IN A NETWORK WITH MULTIPLE SERVICE CLASSES

(75) Inventors: Lotfi M. Benmohamed, Clarksville, MD (US); Joseph G. Kneuer, Montclair, NJ (US); Muralidharan Sampath Kodialam, Marlboro, NJ (US); Yung-Terng Wang, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1513 days.

(21) Appl. No.: 10/119,943

(22) Filed: Apr. 11, 2002

(65) Prior Publication Data

US 2003/0193954 A1 Oct. 16, 2003

(51) Int. Cl.
*H04J 1/16* (2006.01)
*H04J 3/14* (2006.01)

(52) U.S. Cl. .................. 370/230; 370/235; 370/395.2

(58) Field of Classification Search ......... 370/229–236, 370/241, 252, 254, 351, 352, 395.1, 401, 370/503, 517, 480, 465, 461, 462, 403
See application file for complete search history.

(56) References Cited

U.S. PATENT DOCUMENTS

| 6,269,079 B1 * | 7/2001 | Marin et al. ................. 370/230 |
| 6,442,138 B1 * | 8/2002 | Yin et al. ..................... 370/232 |
| 6,504,820 B1 * | 1/2003 | Oliva .......................... 370/232 |
| 6,625,155 B1 * | 9/2003 | Dziong ..................... 370/395.2 |
| 2003/0058796 A1 * | 3/2003 | Anderson, Sr. .............. 370/236 |
| 2003/0063624 A1 * | 4/2003 | Nagarajan et al. ........... 370/468 |
| 2004/0066785 A1 * | 4/2004 | He et al. ................. 370/395.21 |

* cited by examiner

*Primary Examiner*—Ajit Patel

(57) ABSTRACT

The method estimates a capacity requirement as a function of a cell loss ratio (CLR) requirement, estimates a capacity requirement as a function of the a cell delay variation (CDV) requirement, and sets the capacity requirement based on these independent estimates. The capacity requirement is then used to determine connection admission control in the network.

20 Claims, 6 Drawing Sheets

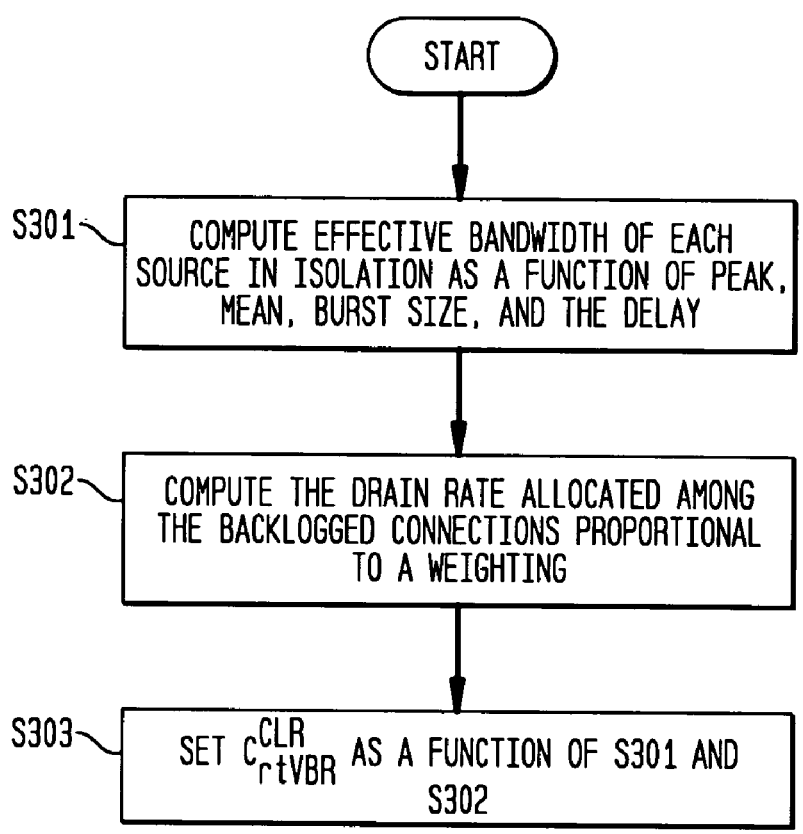

CONNECTION ADMISSION CONTROL FOR BURSTY REAL-TIME TRAFFIC IN A NETWORK WITH MULTIPLE SERVICE CLASSES

BACKGROUND OF THE INVENTION

1. Field of the Invention

The present invention relates to the field of telecommunications and networking, and more particularly, a method and apparatus for controlling connection admission in a network with multiple service classes and quality of service requirements.

2. Description of Related Art

A critical need in managing the resources of a network with multiple service classes and quality of service (QoS) requirements is an effective connection admission control (CAC) algorithm which maximizes the utilization of the network resources while ensuring that QoS requirements of the admitted connections are met. As connection setup requests are received by the network and a transmission path is selected, a real-time local decision needs to be made to accept or reject the request based on the QoS and traffic parameters of the requesting connection as well as the state of the network including resource availability, traffic characteristics, and QoS requirements of the existing connections. Similarly, as connection release messages arrive, appropriate actions need to be taken to release any committed resources.

For example, in an asynchronous transfer mode (ATM) network there exist five service classes: Constant Bit Rate (CBR), real-time Variable Bit Rate (rtVBR), non-real-time Variable Bit Rate (nrtVBR), Available Bit Rate (ABR), and Unspecified Bit Rate (UBR). Of these five service classes, the rtVBR service is the most involved. Indeed, it is the only service category among all guaranteed service categories (CBR, rtVBR, and VBR) that combines both traffic burstiness and multiple QoS requirements (cell loss and delay) since CBR is not bursty and nrtVBR has only cell loss requirements. The other two service categories (ABR and UBR) are mainly best-effort in nature except for a minimum cell rate (MCR) component, which is met by simply reserving bandwidth equal to MCR.

Consider a set of virtual circuits (VCs) having the same QoS requirements given by L, D, and $\alpha$ representing the cell loss ratio (CLR), cell delay variation (CDV), and CDV percentile, respectively. If these VCs are allocated a buffer B and capacity C, then the CLR and CDV requirements are met when $$\text{Prob}(Q_t > B) \leq L, \text{ and} \quad (1)$$

$$\text{Prob}(D_t > D) \leq \alpha \quad (2)$$

where $Q_t$ represents the queue length process and $D_t$ represents the delay process. Since the delay and queue length are related through $D_t = Q_t/C$, (2) can be rewritten as $$\text{Prob}(Q_t > D \cdot C) \leq \alpha \quad (3)$$

The existing CAC algorithms for VBR services do not provide a complete solution and fall into one of the following categories where they either (a) ignore CDV and deal only with CLR and consequently they are applicable to nrtVBR only, or (b) assume a cell loss dominant model where CDV is not binding, or (c) assume a delay dominant model where CLR is not binding and convert the delay requirement into a loss (or buffer overflow) requirement as in equation (3), or (d) assume that the bandwidth and buffer allocations along the QoS requirements are such that the loss and delay performance are violated with the same rate, and therefore assume that $D \cdot C = B$ and $\alpha = L$ so that equation (1) and equation (3) are the same. Moreover, most existing models which deal with "first in, first out" (FIFO) scheduling explicitly model per-VC queuing using assumption (d) above.

SUMMARY OF THE INVENTION

In the method according to the present invention, both the CLR requirement and the CDV requirement for bursty real-time traffic (rtVBR category in ATM) accounted for the per-VC scheduling case. By independently considering the loss and delay requirements without making particular assumptions about the relationship between them and the resource allocations, the present invention solves a more general problem and captures different operating regimes. In particular, the present invention shows that as the traffic mix within the network changes, the operating regime could change from delay-dominant to loss-dominant or vice versa. Therefore, the present invention provides an improved CAC algorithm by increasing utilization of the network resources while ensuring that QoS requirements of the admitted connections are still met regardless of the operating regime of the network.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

according to the method of the present invention; and

FIG. 7 illustrates a flowchart for computing $$C_{rtVBR}^{CDV}$$

according to the method of the present invention.

DETAILED DESCRIPTION OF THE PREFERRED EMBODIMENTS

Figure 1:
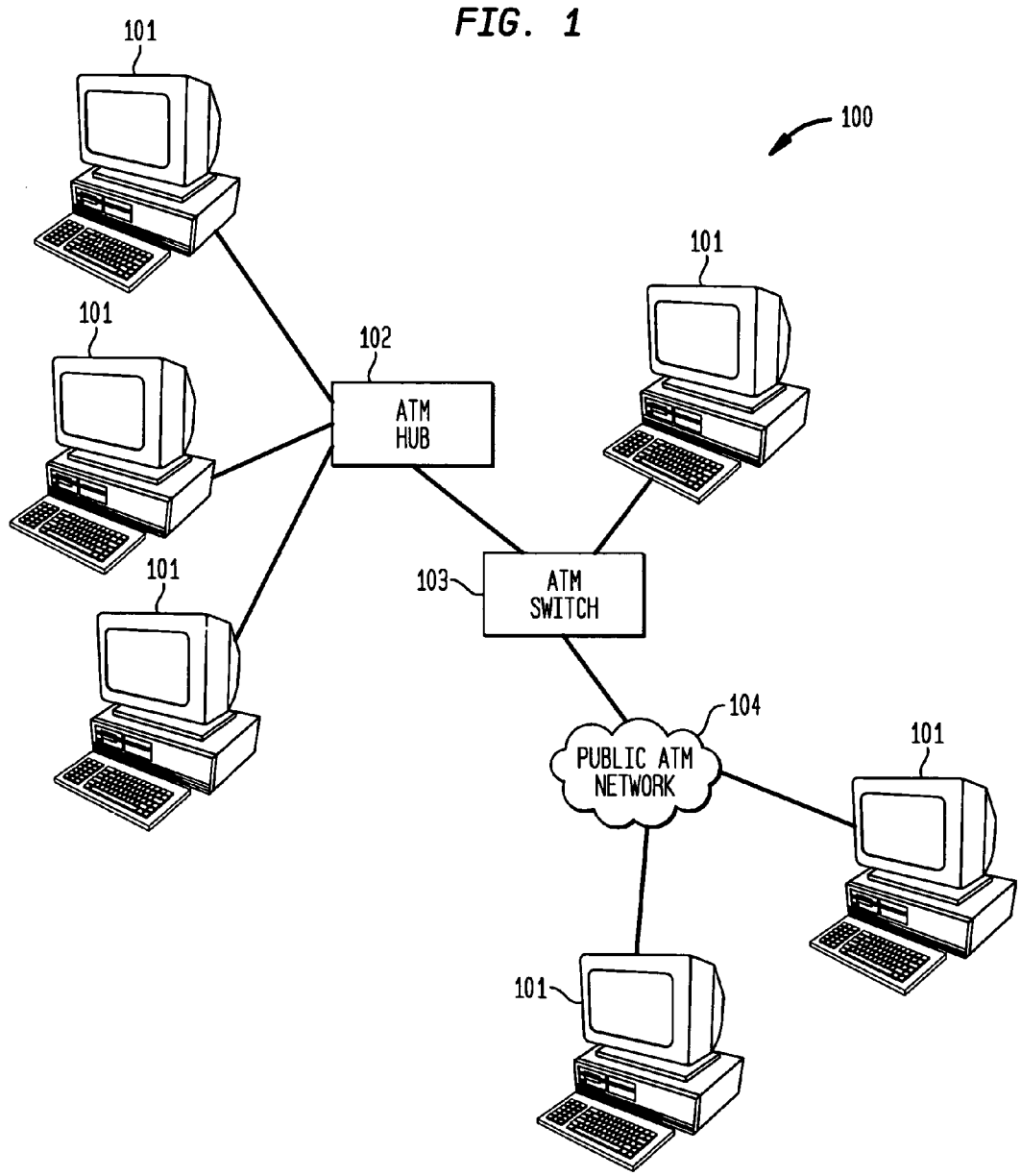
FIG. 1 illustrates a diagram of a network employing the method of the present invention.

FIG. 1 illustrates a diagram of an ATM network 100 employing the method of the present invention including user terminals 101 connected to an ATM hub 102, and an ATM switch 103 connected to the ATM hub 102 and a public ATM network 104. The method of this invention will be described as implemented by an ATM network. ATM is useful as an illustrative application of this invention in part because the definitions of Cell Loss Ratio (CLR) and Cell Delay Variation (CDV) are understood concepts in the field. However, the method of this invention is not limited to this implementation. The method is also applicable to any statistically-multiplexed system of bursty traffic. This includes systems which merge data units at any granularity of fixed or variable length, as well as multi-service/multi-class systems with multiplexed packet flows subject to connection setup CAC and scheduled by a work conserving per class fair queue scheduler. For example, the method of the present invention could be implemented by general packet networks such as an IP network with quality of service (QoS) levels. The above examples are given by way of illustration only, and should not be interpreted to limit the applicability of this invention other types of networks.

Figure 2:
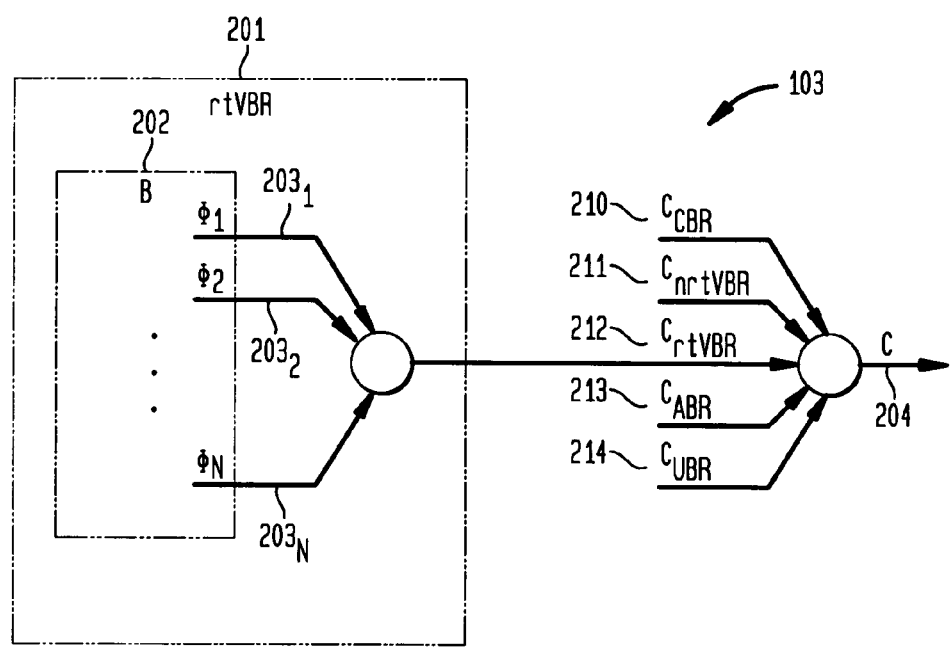
FIG. 2 illustrates the multiplexer model in an ATM switch.

FIG. 2 shows a preferred embodiment use for the queuing and scheduling of rtVBR VCs in a rtVBR scheduler 201 at some output link 204 of an ATM switch 103. The capacity available to rtVBR is allocated to the different VC queues ($203_1, 203_2, \ldots, 203_N$) proportional to their weight $\phi$ using some form of weighted fair queuing scheduling. FIG. 2 shows N VC queues ($203_1, 203_2, \ldots, 203_N$) with weight $\phi_i$ for VC queue i, i ∈ {1, 2, ..., N}, and a total buffer 202 for the rtVBR class equal to B. These N VC queues receive corresponding classes of network traffic from input links which have been omitted from FIG. 2 for clarity.

As far as allocating the total buffer 202 to the different VCs, in a preferred embodiment a complete sharing arrangement whereby an arriving cell from any VC ($203_1, 203_2, \ldots, 203_N$) is lost only when the total buffer occupancy of all VCs reaches capacity B in the total buffer 202 is used. The use of complete sharing instead of partitioning maximizes the statistical multiplexing gain. With this buffer management option, an implication is that the cell losses experienced by each VC are independent of the scheduling discipline (independent of $\phi_i$'s) as long as the scheduler is work conserving. While the method of this invention will be described as implemented with the complete sharing arrangement, the method is not limited to this implementation. Other buffer management options including complete partitioning and partial partitioning of the buffer could also be implemented.

The CAC algorithm estimates the capacity $C_h$ needed by each class h, h ∈ S={CBR, rtVBR, nrtVBR, ABR, UBR}, and makes sure that $\Sigma_{h \in S} C_h \leq C$ where C is the link capacity of the output link 204. FIG. 2 illustrates queues for classes $C_{CBR}$, $C_{nrtVBR}$, $C_{rtVBR}$, $C_{ABR}$, and $C_{UBR}$ (210-214, respectively).

Figure 5:
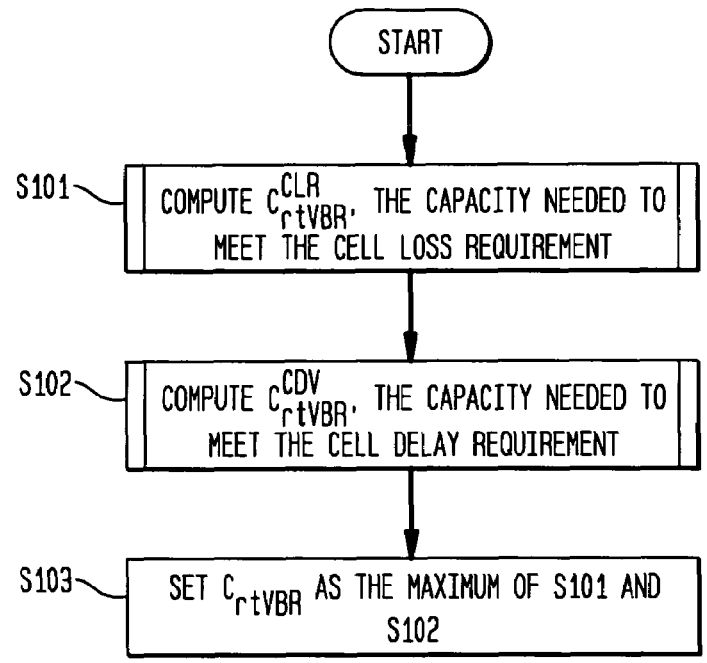
FIG. 5 illustrates a flowchart for computing $C_{rtVBR}$ according to the method of the present invention.

FIG. 5 illustrates one embodiment of the present invention for an improved method of computing $C_{rtVBR}$. In step S101, ATM switch 103 computes $$C_{rtVBR}^{CLR},$$

the capacity needed to meet the cell loss requirement. Then in step S102, ATM switch 103 next computes $C_{rtVBR}^{CDV}$, the capacity needed to meet the cell delay requirement, and then sets $C_{rtVBR}$ as the maximum of the above two quantities in step S103.

$$C_{rtVBR} = \max\{C_{rtVBR}^{CLR}, C_{rtVBR}^{CDV}\} \qquad (4)$$

The details of steps S101 and S102 will be discussed infra.

The above described approach does not make any assumption about how the loss requirement, the delay requirement, and the traffic parameters relate to each other. Specifically, the required capacity to meet the loss requirement and the required capacity to meet the delay requirement are computed independent of one another in steps S101 and S102, respectively. After the two requirements are computed, step S103 obtains the capacity needed to meet both QoS requirements.

Computing $$C_{rtVBR}^{CLR}$$

in Step S101

Figure 6:
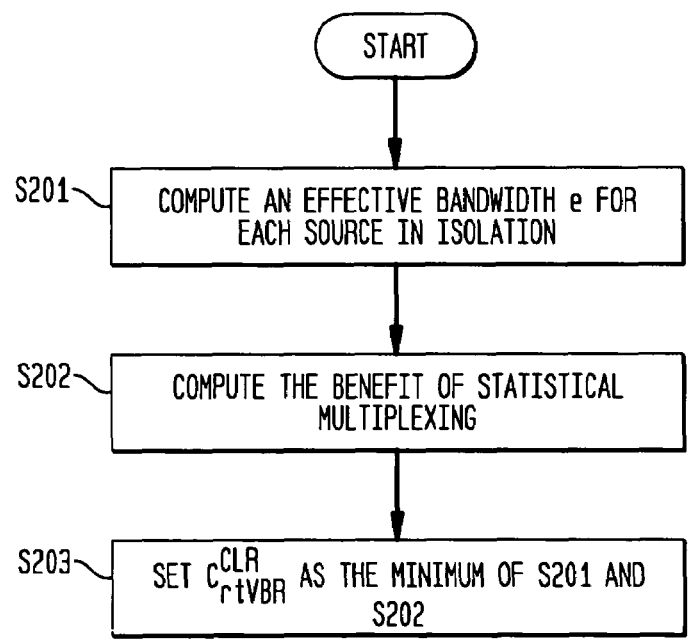
FIG. 6 illustrates a flowchart for computing $$C_{rtVBR}^{CLR}$$

Under the buffer sharing strategy, the overall CLR is independent of the scheduler weights. Therefore, a model for any work-conserving scheduler to compute $$C_{rtVBR}^{CLR}$$

can be used. In a preferred embodiment, we use a FIFO scheduler model. The performance measures of interest for a finite buffer system, when fed with leaky bucket compliant sources, are estimated by using the loss probability ($P_L$) in a two-stage process as shown in FIG. 6. As shown in step S201, ATM Switch 103 computes an effective bandwidth e for each source in isolation.

Step S201 computes an effective bandwidth e for each source in isolation for the FIFO model of a preferred embodiment as a function of a buffer of size B drained at capacity C and fed by J groups of rtVBR sources with $K_j$ being the number of sources in group j, j ∈ {1, 2, ..., J}. Traffic sources are ON/OFF with the traffic descriptor for each source made up of three parameters: peak cell rate (denoted p), sustained cell rate (which is the mean cell rate denoted m), and burst size (denoted b). The ON and OFF periods can be obtained from these parameters as follows: $T_{ON}$=b/p and $T_{OFF}$=b/m−b/p. Sources in each group j have the same traffic descriptor given by the tuple ($p_j$, $m_j$, $b_j$).

Assuming traffic sources are independent with exponentially distributed ON and exponentially distributed OFF periods, the ATM switch 103 computes as a function of B, L, and the traffic descriptor (p, m, b) the following effective bandwidth in step S201:

$$e_1 = \frac{p}{2}\left[1 - \frac{\delta}{1-x} + \sqrt{\left(1 - \frac{\delta}{1-x}\right)^2 + 4\delta\frac{x}{1-x}}\right] \qquad (5)$$

where x=m/p and $\delta$=B/(b Log(1/L)).

Next, in step S202 the ATM switch 103 computes the benefit of statistical multiplexing where the loss probability $P_L$ is approximated by the overflow probability resulting from feeding a bufferless multiplexer with independent traffic sources each having a binomially distributed ON/OFF rate process with peak rate being the equivalent bandwidth e computed in step S201 and with the probability of being in the ON state equal to m/e where m is the mean cell rate of the source.

In computing a total capacity requirement which satisfies the CLR requirement for the rtVBR class including a benefit of statistical multiplexing, the Gaussian approximation is used to estimate a loss probability which is given in terms of the error function by $$L = \text{erf}\left(\frac{C - \sum_{j=1}^{J} K_j m_j}{\sqrt{\sum_{j=1}^{J} K_j m_j (e_j - m_j)}}\right) \quad (6)$$

where $e_j$ is the effective bandwidth computed in step S201 for a VC in group j.

Given the loss requirement L, the above equation needs to be solved ("inverted") for the required capacity C. Equation (6) can be easily inverted using the inverse of the error function to obtain:

$$C = M + \text{erf}^{-1}(L)\sqrt{V} \quad (7)$$

where $$M \triangleq \sum_{j=1}^{J} K_j m_j$$

is the aggregate mean rate and $$V \triangleq \sum_{j=1}^{J} K_j m_j (e_j - m_j)$$

is the variance of the aggregate ON/OFF process (it can be easily shown that the variance for each independent ON/OFF source with peak rate $e_j$ and mean rate mj is $(e_j - m_j)$).

Since the Gaussian approximation is more accurate when more VC's are multiplexed and given the fact that the required capacity should not be greater than the sum of the effective bandwidth of all VCs $$\left(E \triangleq \sum_{j=1}^{J} K_j e_j\right)$$

as based on step S201, the total capacity needed to support the rtVBR class so that the overall CLR is no more than L as based on step S202 is given by:

$$C_{rtVBR}^{CLR} = \min\{E, M + \text{erf}^{-1}(L)\sqrt{V}\} \quad (8)$$

In a preferred embodiment, the ATM switch 103 sets $$C_{rtVBR}^{CLR}$$

in step S203 according to equation (8) as the minimum of the sum of the effective bandwidth of all VCs based on step S201 and the Gaussian approximation based on S202 computed according to equation (7). Further, note that this approach for computing $$C_{rtVBR}^{CLR},$$

which is the capacity needed to meet the CLR requirement, can also be used to compute $C_{nrtVBR}$ since the nrtVBR class has only a loss requirement.

Computing $$C_{rtVBR}^{CDV}$$

in Step S102

FIG. 7 illustrates one embodiment of the present invention for an improved method of computing the capacity needed to satisfy the cell delay requirement, $$C_{rtVBR}^{CDV}.$$

Figure 3A:
FIG. 3 illustrates a graph of the VC traffic, buffer occupancy, VC utilization, and link utilization functions over time.
Figure 3B:
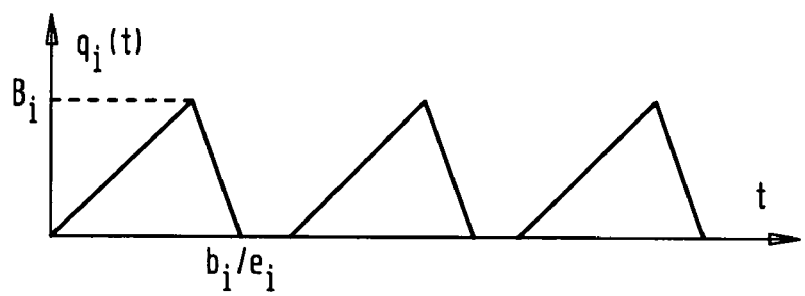
Figure 3C:
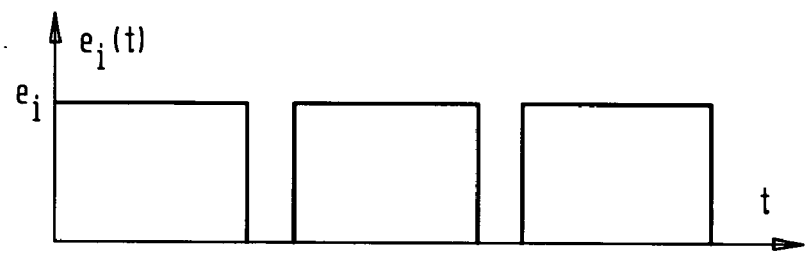
Figure 3D:
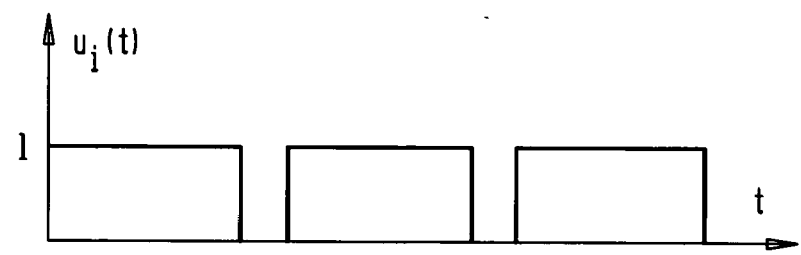
Figure 4:
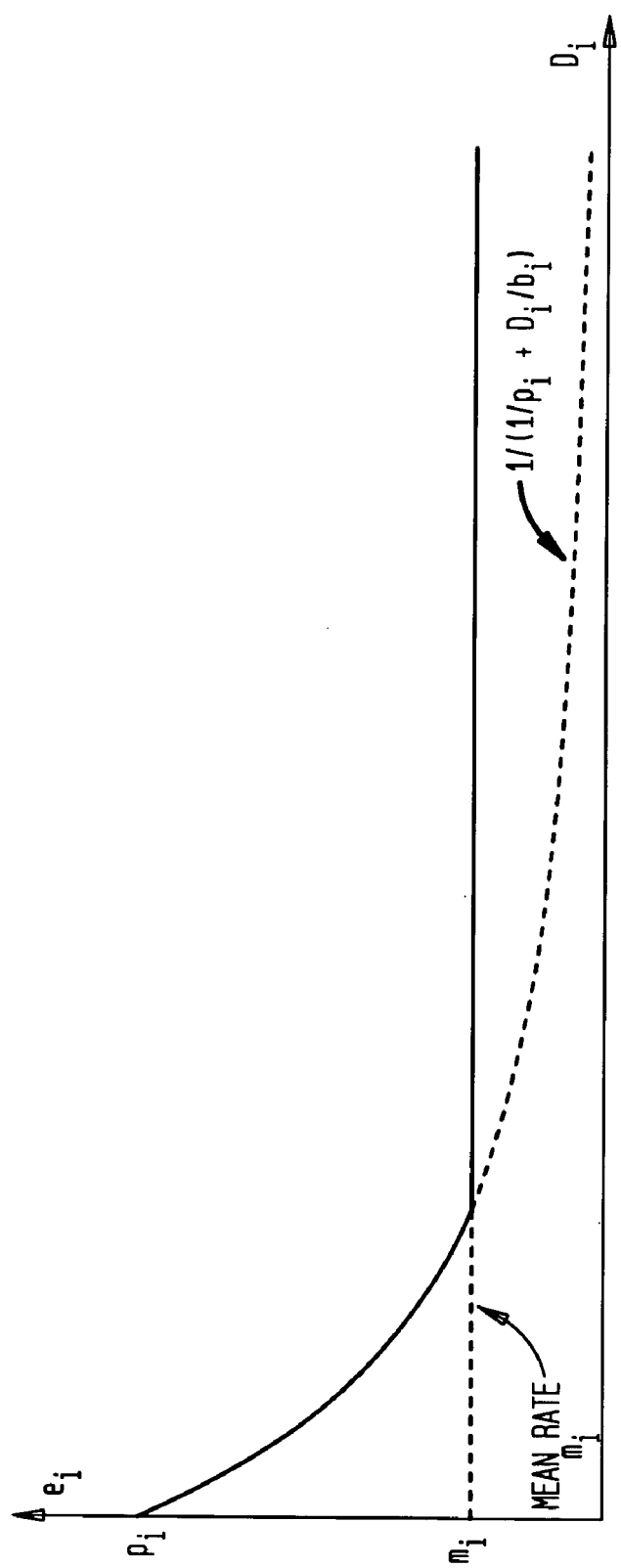
FIG. 4 illustrates a graph of the effective bandwidth requirement and the CDV requirement in the multiplexer model of the present invention.

To compute $$C_{rtVBR}^{CDV},$$

as in step S102, consider VC queue i in FIG. 2 with weight $\phi_i$ in the rtVBR scheduler 201 and with its ON/OFF traffic $r_i(t)$ given by $p_i$, $m_i$, and $b_i$ as shown in FIG. 3(a). If this VC is served at rate $e_i$, then its buffer occupancy is given by $q_i(t)$ in FIG. 3(b) where the maximum value is $B_i = b_i(1 - e_i/p_i)$. The rate $e_i(t)$ at which this VC is using the link is shown in FIG. 3(c) The function $u_i(t)$ in FIG. 3(d) is the link utilization function which is 1 if the VC is using the link (backlogged) and 0 otherwise. The maximum delay experienced by this VC when served at rate $e_i$ is $d_i = B_i/e_i = b_i/e_i - b_i/p_i$. If $D_i$ is the CDV of this VC, a natural choice for the service rate $e_i$ is the rate that results in $d_i = D_i$, which is given by $e_i = 1/(1/p_i + D_i/b_i)$. This value is less than $p_i$ and since, for stability reasons, it has to be less than the mean rate $m_i$, the ATM Switch 103 takes the effective bandwidth $e_i$ in step S301 as:

$$e_i = \max\left\{\frac{1}{\frac{1}{p_i} + \frac{D_i}{b_i}}, m_i\right\} \quad (9)$$

which is a function of the traffic parameters $(p_i, m_i, b_i)$ and the CDV requirement $D_i$ and is shown by the solid curve in FIG. 4.

So far, only VC queue i in isolation was considered and the method did not take into account any statistical multiplexing gain. To do so, consider again the multiplexer model described above and illustrated in FIG. 2. Since the total rate $C_{rtVBR}$ available to the VCs in the rtVBR class is allocated among the currently backlogged connections proportional to their weight in the scheduler ($u_j(t)$ is the indicator function of VC queue j being backlogged), the drain rate ($R_i(t)$) used by the ATM Switch 103 of VC queue i in step S302 is computed as:

$$R_i(t) = \frac{\phi_i u_i(t)}{\sum_j \phi_j u_j(t)} C_{rtVBR} \quad (10)$$

By choosing the weight of VC queue i to be proportional to $e_i$ for all i, the result of equation (10) becomes $$R_i(t) = \frac{e_i u_i(t)}{\sum_j e_j u_j(t)} C_{rtVBR} \quad (11)$$

In order to meet the delay requirement of VC queue i, the condition $R_i(t) \geq e_i$ when VC i is backlogged ($u_i(t)=1$) must hold. Stating this using equation (11) provides:

$$\frac{e_i u_i(t)}{\sum_j e_j u_j(t)} C_{rtVBR}^{CDV} \geq e_i \text{ when } u_i(t) = 1 \quad (12)$$

which implies that, to meet the delay requirements of all VCs, $$\sum_j e_j u_j(t) \leq u_i(t) C_{rtVBR}^{CDV} \text{ when } u_i(t) = 1, \forall i \quad (13)$$

This requirement is met when $$\sum_j e_j u_j(t) \leq C_{rtVBR}^{CDV}, \forall t \quad (14)$$

since, given any time t, if there exists i such that $u_i(t)=1$ then equation (13) is equivalent to equation (14), and if $u_i(t)=0 \, \forall i$, equation (14) is true since $$0 \leq C_{rtVBR}^{CDV}.$$

Note that equation (14) is equivalent to $$\sum_j c_j(t) \leq C_{rtVBR}^{CDV} \quad (15)$$

since, as defined in FIG. 3(c) and FIG. 3(d), $c_i(t)=e_i u_i(t)$.

Since the CDV requirement allows for the delay of VC i to exceed $D_i$ with a small probability $\alpha$, equation (15) may be violated with the same probability $$Prob\left(\sum_j c_j(t) > C_{rtVBR}^{CDV}\right) \leq \alpha \quad (16)$$

In a preferred embodiment, the On/Off process $c_j(t)$ are independent since sources are assumed to be independent, and that the aggregate process $$R(t) = \sum_j c_j(t)$$

is assumed to be Gaussian. Under this assumption, equation (16) is satisfied when $$C_{rtVBR}^{CDV} = M + \delta\sqrt{V} \quad (17)$$

where M and V are the mean and variance of R(t), respectively, and $\delta = \text{erf}^{-1}(\alpha)$ is the inverse of the error function at the CDV percentile value $\alpha$. In step S303, ATM Switch 103 then sets $$C_{rtVBR}^{CDV}$$

according to equation (17) as a function of the results of steps S301 and S302.

The invention being thus described, it will be obvious that the same may be varied in many ways. For example, instead of an ATM network, the network could be any type of network that has multiple service classes. As other alternatives, the method of the present invention could be implemented in a network in which all traffic is bursty, real-time traffic or in a network which has a partitioned buffer. Such variations are not to be regarded as a departure from the spirit and scope of the invention, and all such modifications are intended to be included within the scope of the following claims.

We claim:

1. A method for setting a capacity requirement by a controller for bursty, real-time network traffic within a network to control connection admission, comprising:
    first estimating the capacity requirement as a function of a data loss requirement;
    second estimating the capacity requirement as a function of a data delay requirement, the first estimate and the second estimate are computed independently of each other, the second estimating step includes computing a mean capacity requirement and a variance measure, and setting the second estimating step as a function of the mean capacity requirement, the variance measure, and the data delay requirement;
    setting the capacity requirement based on the first estimate and the second estimate; and
    controlling connection admission to the network based on the capacity requirement.

2. The method of claim 1, wherein the setting step sets the capacity requirement as the maximum of the first estimate and second estimate.

3. The method of claim 1, wherein the first estimating step comprises:
    third estimating the capacity requirement as a sum of effective capacity requirements for each traffic source;

fourth estimating the capacity requirement which captures a benefit of statistical multiplexing as a function of a mean capacity requirement, a variance measure, and the data loss requirement; and setting the first estimate based on the third estimate and the fourth estimate.

4. The method of claim 3, wherein the setting the first estimate step sets the first estimate as the minimum of the third estimate and fourth estimate.

5. The method of claim 1, wherein the second estimating step comprises:

computing an effective bandwidth requirement for each traffic source in isolation based on a mean capacity requirement and a delay curve requirement; and setting the second estimating step such that the delay requirement for all traffic sources is satisfied within a statistical tolerance and based on weighted bandwidth availability over all backlogged connections.

6. The method of claim 5, wherein the effective bandwidth requirement for each traffic source in isolation is computed as the maximum of the mean capacity requirement and the delay curve requirement.

7. The method of claim 1, wherein the network is an ATM network.

8. The method of claim 7, wherein the bursty, real-time traffic is rtVBR class ATM traffic.

9. The method of claim 7, wherein the data loss requirement is based on a cell loss ratio.

10. The method of claim 7, wherein the data delay requirement is based on a cell delay variation.

11. The method of claim 1, wherein the network is an IP network with quality of service levels.

12. The method of claim 11, wherein the bursty, real-time traffic is advertised quality of service traffic.

13. The method of claim 11, wherein the data loss requirement is based on a packet loss ratio.

14. The method of claim 11, wherein the data delay requirement is based on a packet delay variation.

15. A method for controlling connection admission by a controller for bursty, real-time network traffic within a network, comprising:

receiving a connection setup request associated with bursty, real-time network traffic;

first estimating a capacity requirement for the bursty, real-time network traffic within the network and the bursty, real-time network traffic associated with the connection setup request as a function of a data loss requirement;

second estimating a capacity requirement for the bursty, real-time network traffic within the network and the bursty, real-time network traffic associated with the connection setup request as a function of a data delay requirement, the first estimate and the second estimate are computed independently of each other, the second estimating step includes computing a mean capacity requirement and a variance measure, and setting the second estimating step as a function of the mean capacity requirement, the variance measure, and the data delay requirement; and controlling connection admission based on the first estimate and the second estimate.

16. The method of claim 15, wherein the controlling step allows connection admission when the maximum of the first estimate and second estimate is below a maximum capacity value.

17. The method of claim 15, wherein the first estimating step comprises:

third estimating the capacity requirement as a sum of effective capacity requirements for each traffic source;

fourth estimating the capacity requirement which captures a benefit of statistical multiplexing as a function of a mean capacity requirement, a variance measure of the capacity requirement, and the data loss requirement; and setting the first estimate based on the third estimate and the fourth estimate.

18. A method for ensuring quality of service requirements by a controller for bursty, real-time network traffic within a network, comprising:

receiving a connection setup request associated with bursty, real-time network traffic;

first estimating a capacity requirement for the bursty, real-time network traffic within the network and the bursty, real-time network traffic associated with the connection setup request as a function of a data loss requirement;

second estimating a capacity requirement for the bursty, real-time network traffic within the network and the bursty, real-time network traffic associated with the connection setup request as a function of a data delay requirement, the first estimate and the second estimate are computed independently of each other, the second estimating step includes computing a mean capacity requirement and a variance measure, and setting the second estimating step as a function of the mean capacity requirement, the variance measure, and the data delay requirement; and refusing connection admission requests based on the first estimate and the second estimate.

19. The method of claim 18, wherein the refusing step refuses connection admission requests when the maximum of the first estimate and second estimate is greater than a maximum capacity value.

20. The method of claim 18, wherein the first estimating step comprises:

third estimating the capacity requirement as a sum of effective capacity requirements for each traffic source;

fourth estimating the capacity requirement which captures a benefit of statistical multiplexing as a function of a mean capacity requirement, a variance measure of the capacity requirement, and the data loss requirement; and setting the first estimate based on the third estimate and the fourth estimate.

* * * * *